US007908787B2

(12) United States Patent
Finley

(10) Patent No.: US 7,908,787 B2
(45) Date of Patent: Mar. 22, 2011

(54) ARTIFICIAL FISHING LURE WITH MECHANICAL HOOK ASSEMBLY

(76) Inventor: James N. Finley, Lenoir, NC (US)

( * ) Notice: Subject to any disclaimer, the term of this patent is extended or adjusted under 35 U.S.C. 154(b) by 37 days.

(21) Appl. No.: 12/313,159

(22) Filed: Nov. 18, 2008

(65) Prior Publication Data

US 2009/0288329 A1 Nov. 26, 2009

Related U.S. Application Data

(63) Continuation-in-part of application No. 12/154,300, filed on May 22, 2008.

(51) Int. Cl.
*A01K 83/02* (2006.01)
*A01K 83/06* (2006.01)

(52) U.S. Cl. ........ 43/36; 43/34; 43/35; 43/44.2; 43/44.8

(58) Field of Classification Search ................ 43/34–37, 43/44.2, 44.4, 44.6, 44.8
See application file for complete search history.

(56) References Cited

U.S. PATENT DOCUMENTS 43,694 A * 8/1864 Lenhart ........ 43/34
321,796 A * 7/1885 Clark ........ 43/36
387,015 A * 7/1888 Smith ........ 43/36
610,098 A * 8/1898 Sly ........ 43/36
945,091 A * 1/1910 Hanel ........ 43/35
969,014 A * 8/1910 Walters ........ 43/35
1,009,538 A * 11/1911 Lowe ........ 43/35
1,033,755 A * 7/1912 Calvert ........ 43/34
1,172,780 A * 2/1916 Ferree ........ 43/36
1,288,552 A * 12/1918 Foster ........ 43/35
1,318,073 A * 10/1919 Gottschalk ........ 43/35
1,324,109 A * 12/1919 Dutes ........ 43/44.6
1,354,952 A * 10/1920 Bullock ........ 43/35
1,448,735 A * 3/1923 Edmondson ........ 43/36
1,466,620 A * 8/1923 Guy ........ 43/37
1,571,770 A * 2/1926 Fenner ........ 43/35
1,591,640 A * 7/1926 Middleton ........ 43/36
1,609,160 A * 11/1926 Deckman ........ 43/36
1,774,539 A * 9/1930 Ahlfors ........ 43/36

(Continued)

FOREIGN PATENT DOCUMENTS

GB 2049381 A * 12/1980

(Continued)

*Primary Examiner* — Darren W Ark
(74) *Attorney, Agent, or Firm* — Schwartz Law Firm, P.C.

(57) ABSTRACT

An artificial fishing lure includes a base assembly, a spring-biased hook assembly, a movable hook-setting post, a fixed retention member, and a pivoted actuation lever. The base assembly has spaced apart leading and trailing ends. The hook assembly is carried by the base assembly, and is adapted for sudden movement from a loaded condition to a released condition. The hook assembly has a proximal end and a pointed distal end adapted for piercing a fish. The hook-setting post is located adjacent the leading end of the base assembly, and is adapted for temporarily engaging the proximal end of the hook assembly in the loaded condition. The fixed retention member is located adjacent the trailing end of said base assembly, and is adapted for cooperating with the hook-setting post to temporarily hold the hook assembly in the loaded condition. The actuation lever is connected to the hook-setting post, and is adapted for moving the hook-setting post away from the hook assembly when actuated. The hook-setting post then disengages the proximal end of the hook assembly, and thereby releases the hook assembly for sudden rearward movement outwardly from the retention member from the loaded condition to the released condition.

9 Claims, 19 Drawing Sheets

100 128 129 112 126 111A 115 "S" 111 122 110 "P" 111B 121 125 123 "P" "B" "B" 113 116 136

100 136 133 135 113 111 121 112 132 128 131 114 126

U.S. PATENT DOCUMENTS 1,791,084 A * 2/1931 Pike .................................. 43/35
1,803,560 A * 5/1931 Rodin ................................ 43/36
1,803,561 A * 5/1931 Rodin ................................ 43/36
2,009,298 A * 7/1935 Nelson et al. ..................... 43/34
2,010,641 A * 8/1935 Nyvall ............................. 43/35
2,225,965 A * 12/1940 Ball .................................. 43/36
2,242,592 A * 5/1941 Noxon .............................. 43/35
2,445,461 A * 7/1948 St John ............................ 43/35
2,445,601 A * 7/1948 Carlsen et al. .................... 43/36
2,470,861 A * 5/1949 Prentice ........................... 43/35
2,485,946 A * 10/1949 Watt ................................. 43/35
2,505,051 A * 4/1950 Kridler ............................ 43/35
2,505,052 A * 4/1950 Kridler ............................ 43/35
2,517,844 A * 8/1950 Cooney ............................ 43/35
2,518,238 A * 8/1950 Keeler ............................. 43/35
2,521,555 A * 9/1950 Widmer ........................... 43/35
2,526,288 A * 10/1950 Shields et al. ................... 43/36
2,544,782 A * 3/1951 Fawcett ........................... 43/36
2,546,614 A * 3/1951 Prentice ........................... 43/35
2,552,113 A * 5/1951 Prentice ........................... 43/35
2,593,476 A * 4/1952 Nelson ............................. 43/35
2,670,558 A * 3/1954 Prentice ........................... 43/35
2,700,842 A * 2/1955 Lehmann .......................... 43/35
2,722,764 A * 11/1955 Juhrend ........................... 43/35
2,727,329 A * 12/1955 Robinson .......................... 43/35
2,729,013 A * 1/1956 Chandler .......................... 43/35
2,748,520 A * 6/1956 Anderson ......................... 43/35
2,752,719 A * 7/1956 Walters ............................ 43/36
2,754,613 A * 7/1956 Rogers et al. .................. 43/44.6
2,780,022 A * 2/1957 Arntzen ......................... 43/44.6
2,791,059 A * 5/1957 Holmberg ...................... 43/44.2
2,797,522 A * 7/1957 Friedrich ....................... 43/44.8
2,808,673 A * 10/1957 Coughlin .......................... 43/37
2,811,803 A 11/1957 Wilson
2,821,046 A * 1/1958 Fisk ............................... 43/44.2
2,836,922 A * 6/1958 Cox .............................. 43/44.2
2,880,545 A * 4/1959 Stadler ........................... 43/44.2
2,896,355 A * 7/1959 Dean et al. ........................ 43/35
2,940,208 A * 6/1960 Oswald .......................... 43/44.6
2,949,690 A * 8/1960 Clough ............................ 43/36
2,979,848 A * 4/1961 McConnell ....................... 43/37
2,998,669 A * 9/1961 Shook ............................ 43/44.8
3,018,582 A * 1/1962 Anderson ......................... 43/35
3,020,667 A * 2/1962 Lamar ............................... 43/35
3,059,371 A * 10/1962 Haynie, Sr. ....................... 43/35
3,076,282 A * 2/1963 Wilcox ............................ 43/35
3,100,359 A * 8/1963 Laba ................................ 43/35
3,159,940 A * 12/1964 Bokun ............................. 43/35
3,193,962 A * 7/1965 Simpson ........................ 43/44.2
3,197,911 A * 8/1965 Rolfsness et al. .............. 43/44.2
3,284,945 A * 11/1966 Kurtis ............................ 43/44.2
3,359,675 A * 12/1967 Call ............................... 43/44.8
3,543,434 A * 12/1970 Hauck ............................ 43/44.6
3,574,265 A * 4/1971 Gibbons ........................... 43/35
3,587,189 A * 6/1971 Kopicko ........................ 43/44.8
3,600,838 A * 8/1971 Bablick .......................... 43/44.8
3,624,950 A * 12/1971 Merckes ........................ 43/44.2
3,665,634 A * 5/1972 Baud ................................ 43/35
3,742,639 A * 7/1973 Butts ............................. 43/44.2
3,760,525 A * 9/1973 Daughtry ....................... 43/44.2
3,778,917 A * 12/1973 Peippo .............................. 43/35
3,816,953 A * 6/1974 Hameen-Anttila ............... 43/35
3,818,626 A * 6/1974 Peippo .............................. 43/35
3,839,814 A * 10/1974 Sykora ........................... 43/44.2
3,890,735 A * 6/1975 Serrill ............................... 43/36
3,905,149 A * 9/1975 McCloud ....................... 43/44.8
3,940,870 A * 3/1976 Pettersen ....................... 43/44.2
3,945,145 A * 3/1976 Holden .......................... 43/44.6
4,020,583 A 5/1977 Gatlyn
4,054,004 A 10/1977 Schott
4,067,135 A * 1/1978 Martin ........................... 43/44.2
4,079,538 A * 3/1978 Burnett ............................. 43/36
4,104,820 A * 8/1978 Bardebes .......................... 43/36
4,126,956 A * 11/1978 Bayer ............................ 43/44.2
4,349,979 A * 9/1982 Strantz ........................... 43/44.8
4,402,155 A * 9/1983 Mumma ...................... 43/42.09
4,403,437 A 9/1983 Shuman
4,422,260 A * 12/1983 Perrick .......................... 43/44.8
4,442,622 A * 4/1984 Sartain .............................. 43/35
4,446,647 A * 5/1984 Kahl ................................. 43/36
4,476,646 A * 10/1984 Weiman ............................ 43/34
4,528,770 A * 7/1985 McDiarmid ....................... 43/35
4,726,142 A * 2/1988 Tapley .............................. 43/36
4,738,048 A * 4/1988 Junkas ........................... 43/44.2
4,796,376 A * 1/1989 Schlaegel ....................... 43/44.6
4,850,132 A * 7/1989 Motyka .......................... 43/44.2
4,873,781 A * 10/1989 Bates ................................ 43/35
4,881,339 A * 11/1989 Wirkus ........................ 43/42.04
4,885,863 A 12/1989 Sprague
4,934,092 A 6/1990 Simmons et al.
5,189,826 A * 3/1993 Schlaegel ....................... 43/44.6
5,269,089 A 12/1993 Gariglio
5,274,946 A 1/1994 Fusco
5,388,367 A 2/1995 Rydell
5,526,602 A 6/1996 Day, Sr.
5,564,216 A * 10/1996 McMillan ......................... 43/37
5,878,524 A * 3/1999 Braden ............................. 43/35
5,890,314 A * 4/1999 Peters ............................... 43/36
6,038,806 A * 3/2000 Maitland ........................ 43/44.8
6,050,018 A * 4/2000 Allen ............................. 43/44.2
6,073,384 A * 6/2000 Schlaegel ....................... 43/44.2
6,282,831 B1 * 9/2001 Hugunin et al. ............... 43/44.8
6,405,477 B1 * 6/2002 Huppert ......................... 43/44.8
6,497,068 B1 12/2002 Lemons
6,516,552 B2 * 2/2003 Hawkins ........................ 43/44.2
6,574,908 B1 6/2003 Sanner
6,941,695 B2 9/2005 Minegar
7,107,718 B1 * 9/2006 Alajajyan .................... 43/42.04
7,698,852 B1 * 4/2010 Cox et al. .......................... 43/37
2002/0073599 A1 6/2002 Brinkman

FOREIGN PATENT DOCUMENTS

JP 02092226 A * 4/1990
JP 10295220 A * 11/1998
JP 11056168 A * 3/1999
JP 2002000128 A * 1/2002
JP 2003259764 A * 9/2003

* cited by examiner 24
12
31
25
31
10
11

ARTIFICIAL FISHING LURE WITH MECHANICAL HOOK ASSEMBLY

TECHNICAL FIELD AND BACKGROUND

The present disclosure relates broadly to an artificial fishing lure which incorporates a mechanical hook assembly. In terms of recreational fishing, a lure is an object attached to the end of fishing line and designed to resemble and move like an item of fish prey. The basic purpose of the lure is to use movement, vibrations, and/or color to catch the fish's attention and to entice the fish to "bite" the hook. Conventional lures may be equipped with one or more exposed single, double, or treble hooks. Such lures are generally used with a fishing rod and fishing reel. When a lure is used for casting, it is continually cast out and retrieved—the retrieval making the lure "swim" through the water.

The concept of the present disclosure may be incorporated in many different types of fishing lures. For example, the present lure may comprise or incorporate a jig, spoon, plug (or crankbait), artificial fly, bass worm, spinnerbait, or the like. Additionally, multiple lures of the present disclosure may be used on a single line, as in the manner of a trotline.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

According to one exemplary embodiment, the present disclosure comprises an artificial fishing lure incorporating a spring-biased hook assembly adapted for sudden movement from a loaded condition to a released condition. A hook-setting base temporarily retains the hook assembly in the loaded condition. A pliant, outwardly-flexed compression trigger is adapted for straightening upon application of an inwardly directed force. When straightened, the trigger pushes the hook-setting base away from the hook assembly, and releases the hook assembly for sudden movement from the loaded condition to the released condition. The term "lure" is used broadly herein to mean any device used alone, or in combination with other devices, elements, or structure, for purposes of attracting and/or catching fish.

According to another exemplary embodiment, the hook assembly comprises first and second integrally-formed metal hooks having oppositely directed bends and points.

According to another exemplary embodiment, the first and second hooks define respective outwardly curved pinch points adapted for being simultaneously pressed together to return the hook assembly from the released condition to the loaded condition.

According to another exemplary embodiment, the hook assembly defines an eye for receiving a free end of fishing line.

According to another exemplary embodiment, the hook-setting base comprises a weighted body defining a pocket for releasably receiving a portion of the hook assembly in the loaded condition.

According to another exemplary embodiment, the outwardly-flexed trigger comprises opposing, resilient legs formed with the weighted body and attached (and locked) to the hook assembly adjacent the eye.

According to another exemplary embodiment, with the hook assembly in the loaded condition, the resilient legs are laterally spaced apart a distance of between 10 and 20 mm at opposing points of greatest flexion.

According to another exemplary embodiment, with the hook assembly in the released condition, the resilient legs are laterally spaced apart a maximum distance of less than 15 mm.

In yet another exemplary embodiment, the present disclosure comprises an artificial fishing lure incorporating a spring-biased hook assembly and hook-setting ring. The hook assembly is adapted for sudden movement from a loaded condition to a released condition, and comprises at least one hook having an elongated shank and bend. The hook-setting ring is carried on the shank of the hook adjacent the bend for temporarily retaining the hook assembly in the loaded condition. A compression trigger including a projecting tooth is adapted for engaging the hook-setting ring, and moving the ring along the shank of the hook upon application of an inwardly directed force. Sliding movement of the hook-setting ring away from the bend of the hook releases the hook assembly for sudden movement from the loaded condition to the released condition.

According to another exemplary embodiment, the hook assembly includes first and second integrally-formed metal hooks having oppositely directed bends and points. Use of multiple hooks may effect multiple holds upon the fish. Alternatively, the hook assembly may comprise only a single hook.

According to another exemplary embodiment, the hook assembly defines an eye for receiving a free end of fishing line.

According to another exemplary embodiment, the compression trigger includes a folded flat metal spring comprising first and second spaced-apart opposing metal plates. Alternatively, the compression trigger (and/or other components of the fishing lure) may be formed of a plastic or any other suitable material.

According to another exemplary embodiment, the projecting tooth comprises an integrally-formed portion of the first metal plate bent inwardly towards the second metal plate.

According to another exemplary embodiment, the projecting tooth has a substantially wedge-shaped profile.

According to another exemplary embodiment, the second metal plate defines a tooth opening adapted for receiving a tip of the projecting tooth upon compression of the trigger.

According to another exemplary embodiment, the compression trigger includes a cooperating second projecting tooth comprising an integrally-formed portion of the second metal plate bent inwardly towards the first metal plate.

According to another exemplary embodiment, the second projecting tooth has a substantially wedge-shaped profile.

According to another exemplary embodiment, the first metal plate defines a tooth opening adapted for receiving a tip of the second projecting tooth upon compression of the trigger.

According to another exemplary embodiment, the compression trigger comprises integrally-formed (or separately formed) bait attachment pins extending between the first and second metal plates.

In yet another exemplary embodiment, the invention may comprise an artificial fishing lure having a base assembly, a spring-biased hook assembly, a movable hook-setting post, a fixed retention member, and a pivoted actuation lever. The base assembly has spaced apart leading and trailing ends. The hook assembly is carried by the base assembly, and is adapted for sudden movement from a loaded condition to a released condition. The hook assembly comprises a proximal end and a pointed distal end adapted for piercing a fish. The hook-setting post is located adjacent the leading end of the base assembly, and is adapted for temporarily engaging the proximal end of the hook assembly in the loaded condition. The fixed retention member is located adjacent the trailing end of said base assembly, and is adapted for cooperating with the hook-setting post to temporarily hold the hook assembly in the loaded condition. The actuation lever is connected to the hook-setting post, and is adapted for moving the hook-setting post away from the hook assembly when actuated. The hook-setting post then disengages the proximal end of the hook assembly, and thereby releases the hook assembly for sudden rearward movement outwardly from the retention member from the loaded condition to the released condition.

According to another exemplary embodiment, the hook assembly comprises first and second integrally-formed metal hooks having oppositely directed bends and points.

According to another exemplary embodiment, the hook assembly defines an eye at its proximal end for receiving a free end of fishing line.

According to another exemplary embodiment, the base assembly comprises a substantially planar body defining opposing outwardly-flared wings designed for guarding the pointed distal end of the hook assembly in the loaded condition.

According to another exemplary embodiment, a line-guiding head is integrally formed with the actuation lever and located at the leading end of the base assembly.

According to another exemplary embodiment, the line-guiding head defines a through-bore for receiving a free end of fishing line.

According to another exemplary embodiment, an elongated bait-attaching tail is located at the trailing end of the base assembly.

According to another exemplary embodiment, the retention member comprises a retention bridge defining an underpassage through which the hook assembly extends.

According to another exemplary embodiment, a hook stop is located rearward of the retention bridge, and is adapted for limited rearward movement of the hook assembly from the loaded condition to the released condition.

BRIEF DESCRIPTION OF THE DRAWINGS

The description of exemplary embodiments proceeds in conjunction with the following drawings, in which.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterite) is not intended to indicate or imply that the invention has been previously reduced to practice or that any testing has been performed.

Figure 1:
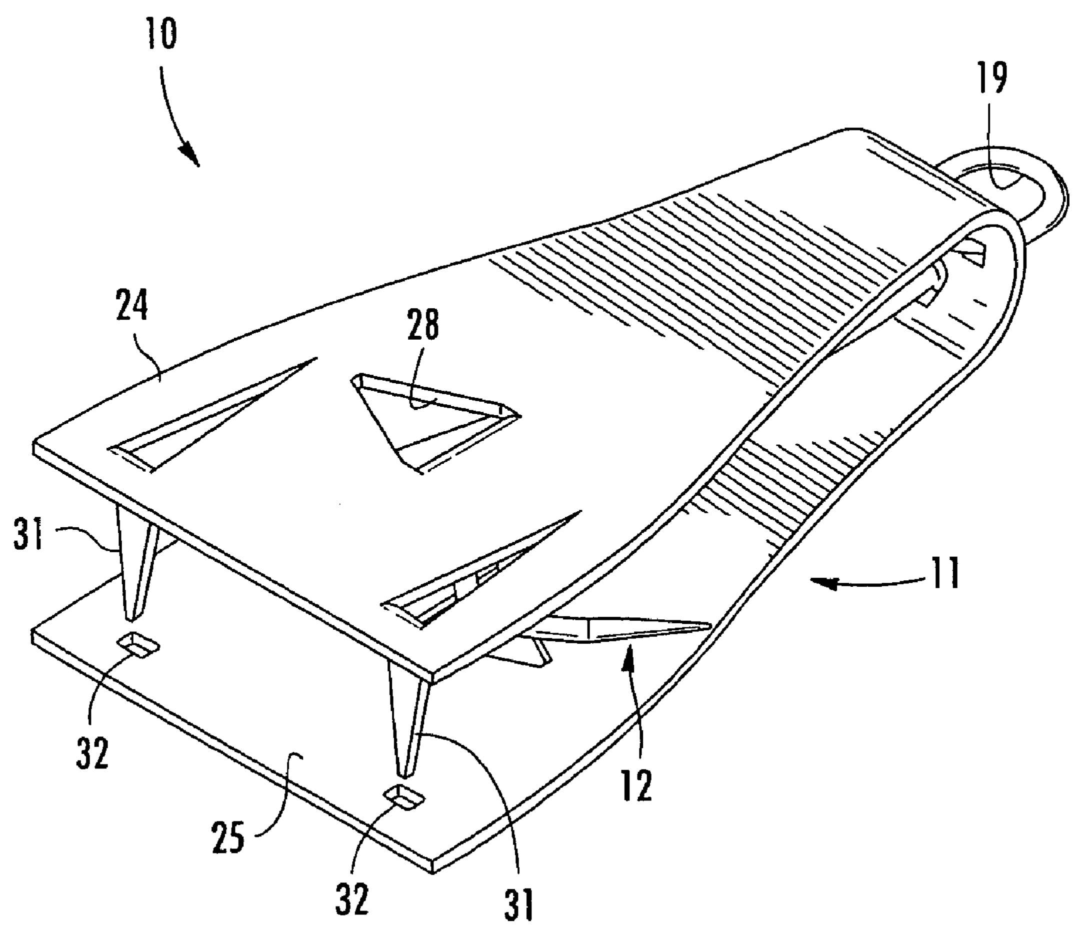
FIG. 1 is a perspective view of a mechanical fishing lure according to one exemplary embodiment of the present disclosure.
Figure 2:
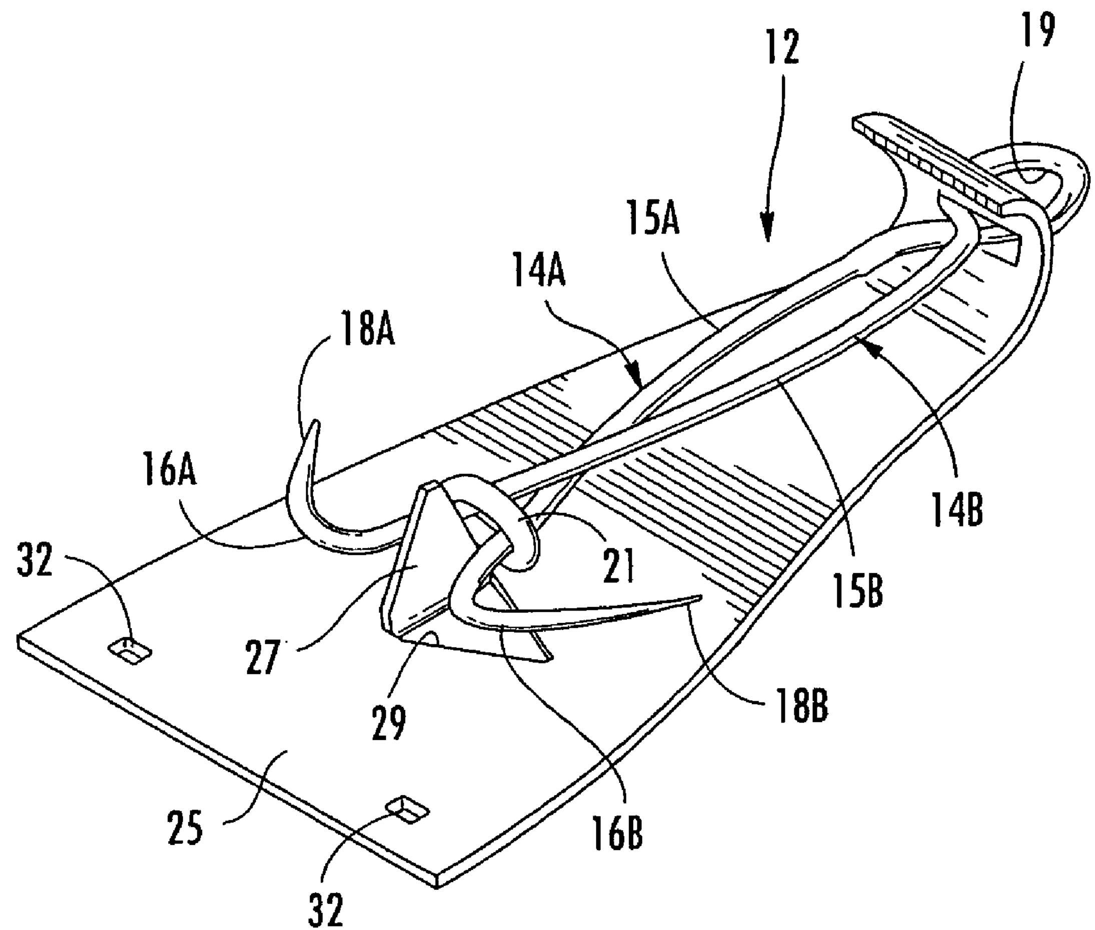
FIG. 2 is a perspective view of the mechanical fishing lure with a portion of the lure body broken away to illustration the hook assembly in a loaded or set condition.
Figure 3:
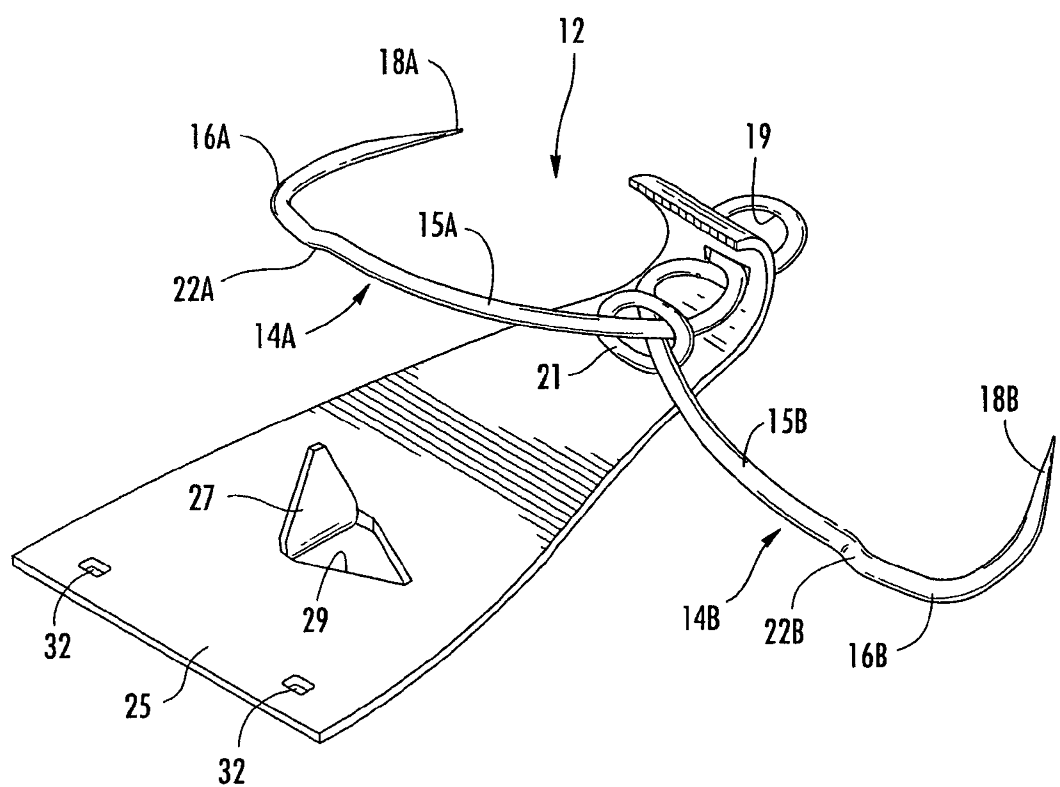
FIG. 3 is a perspective view of the mechanical fishing lure with a portion of the lure body broken away to illustration the hook assembly in the released or tripped condition.
Figure 4:
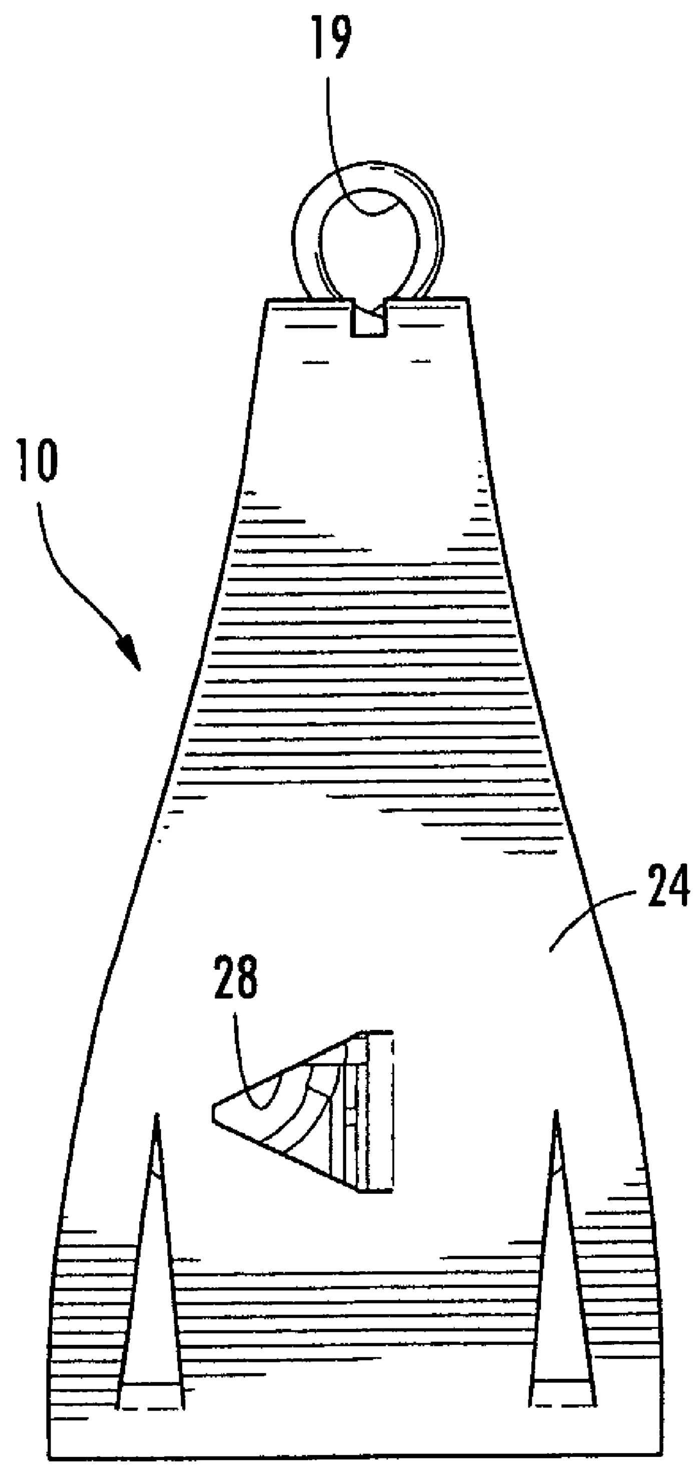
FIGS. 4 and 5 are opposing plan views of the mechanical fishing lure with the hook assembly in the loaded condition.
Figure 5:
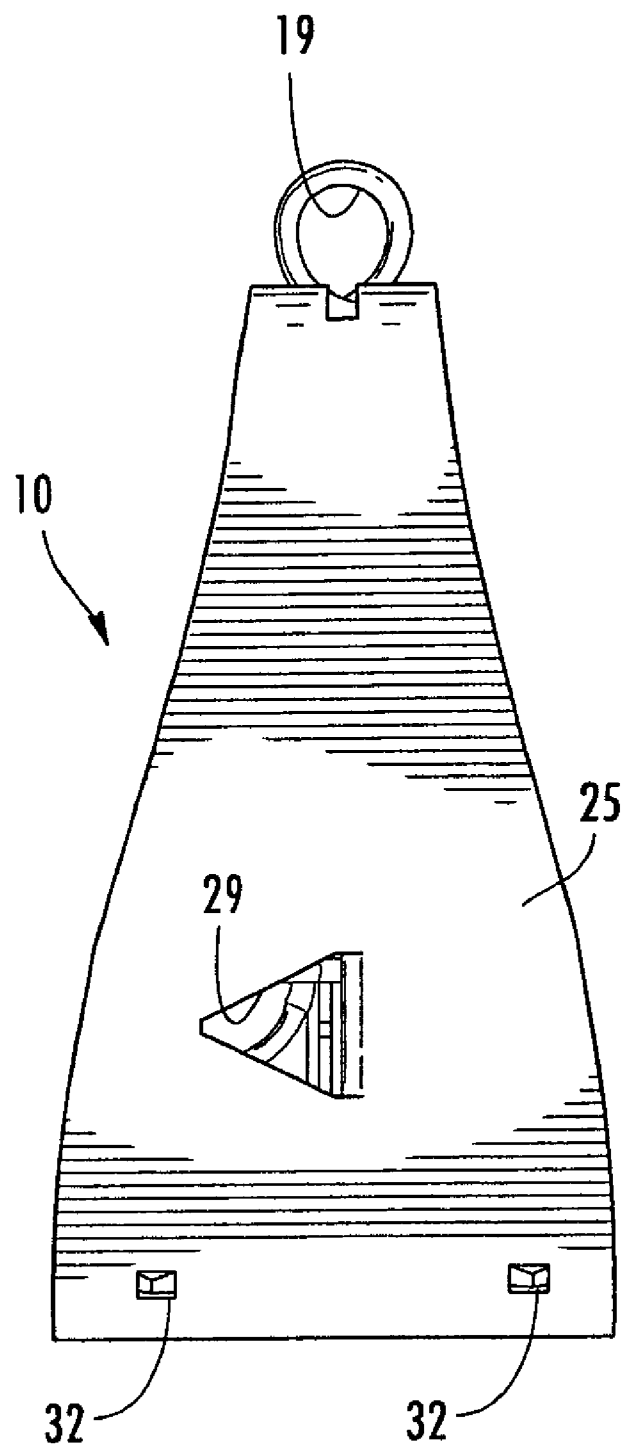
Figure 6:
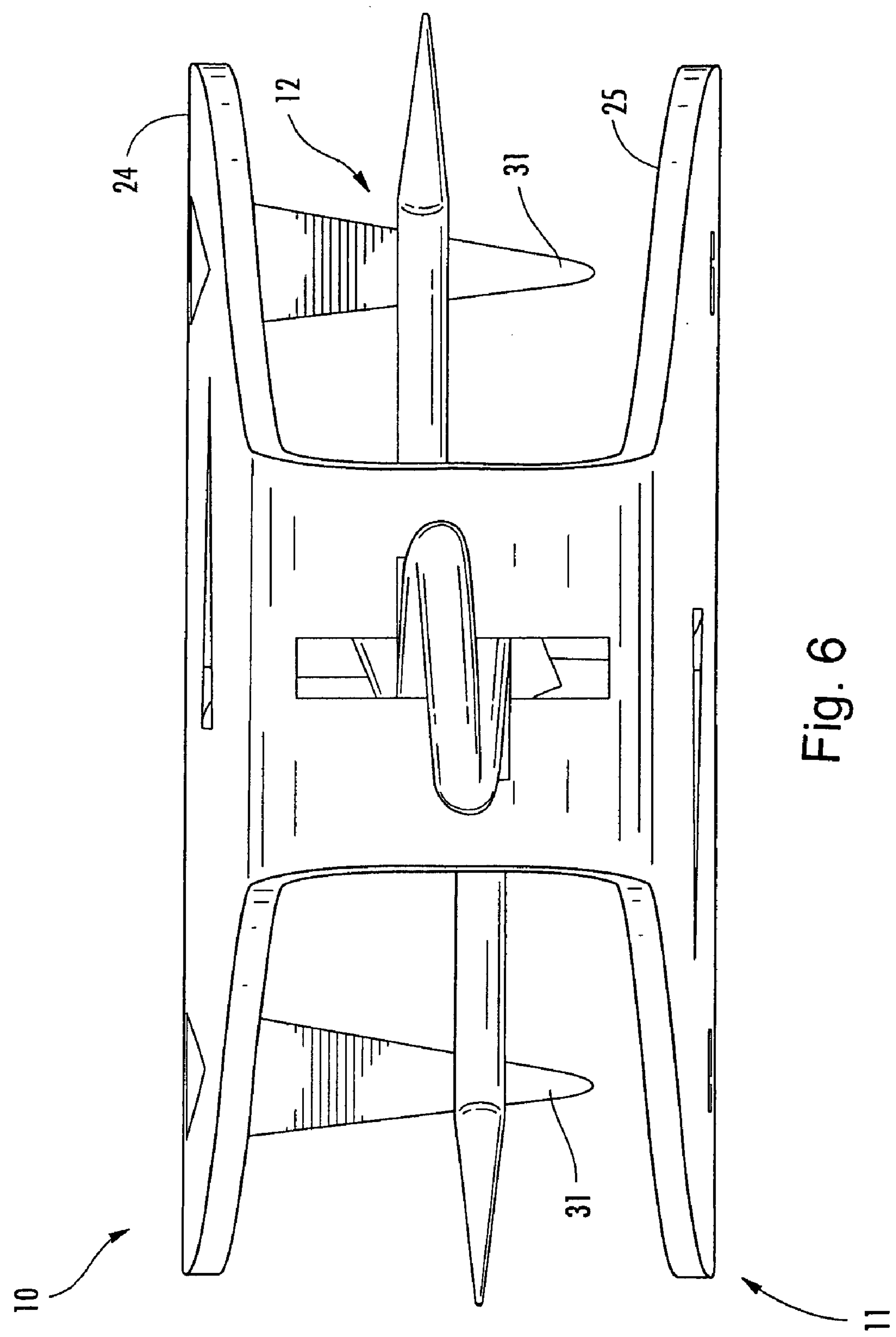
FIG. 6 is an end view of the mechanical fishing lure, and showing the hook assembly in the loaded condition.

Referring now specifically to the drawings an artificial, mechanical fishing lure according to one exemplary embodiment of the present invention is illustrated in FIG. 1 and shown generally at reference numeral 10. The exemplary fishing lure 10 is shown in FIGS. 1-9. In this embodiment, the fishing lure 10 comprises a cooperating weighted lure body 11 and spring-biased double hook assembly 12. As best shown in FIGS. 2 and 3, the hook assembly comprises first and second integrally-formed metal hooks 14A, 14B adapted for sudden movement, as discussed below, from a loaded (or "set") condition to a released (or "tripped") condition. The hooks 14A, 14B have respective elongated shanks 15A, 15B, and oppositely directed bends 16A, 16B and points 18A, 18B. Proximal ends of the shanks 15A, 15B curve into a single common eye 19 through which a free end of fishing line may be inserted and attached. A hook-setting ring 21 is carried on respective shanks 15A, 15B of the hooks 14A, 14B adjacent the bends 16A, 16B, as shown in FIG. 2, and serves to temporarily retain the hook assembly 12 in the loaded condition. The shank 15A, 15B of each hook 14A, 14B may also define a slight jog 22A, 22B proximate the bend 16A, 16B for seating and precisely locating the hook-setting ring 21 upon movement of the hook assembly 12 into the loaded condition.

Referring to FIGS. 1 and 4-7, the exemplary lure body 11 substantially covers the loaded hook assembly 12, and may comprise a stamped and folded metal blank constructed of any suitable finished or non-finished high carbon spring steel, nickel-silver, high-nickel alloy, stainless steel, phosphor-bronze and beryllium-copper combination, or the like. The curve radius "R" (FIG. 7) at the fold, or hinge point, may be in the range of 2 to 10 mm. When folded, the metal blank forms opposing resiliently-spaced flat metal plates 24 and 25 of the lure body 11. Each metal plate 24, 25 has a cut and integrally-bent rigid tooth 26 and 27 which projects inwardly from one plate to the other. In the embodiment shown, each tooth 26, 27 has a substantially wedge-shaped profile. When the hook assembly 12 is in the loaded condition, the teeth 26, 27 align relative to the hook-setting ring 21 such that an inwardly directed compression force acting on the spaced metal plates 24, 25 brings the teeth 26, 27 together, thereby engaging the hook-setting ring 21 and unseating the ring from its location adjacent the shank jogs 22A, 22B. When the lure body 11 is compressed, the points of the teeth 26, 27 may pass through respective openings 28, 29 defined in the metal plates 24, 25. Once the compression force is removed, the metal plates 24, 25 return to their originally spaced position. Bait attachment pins 31 comprising additional cut and bent portions of the metal plate 24 may extend between the plates, and pass through aligned openings 32 in the opposing plate 25 upon compression of the lure body 11.

Figure 7:
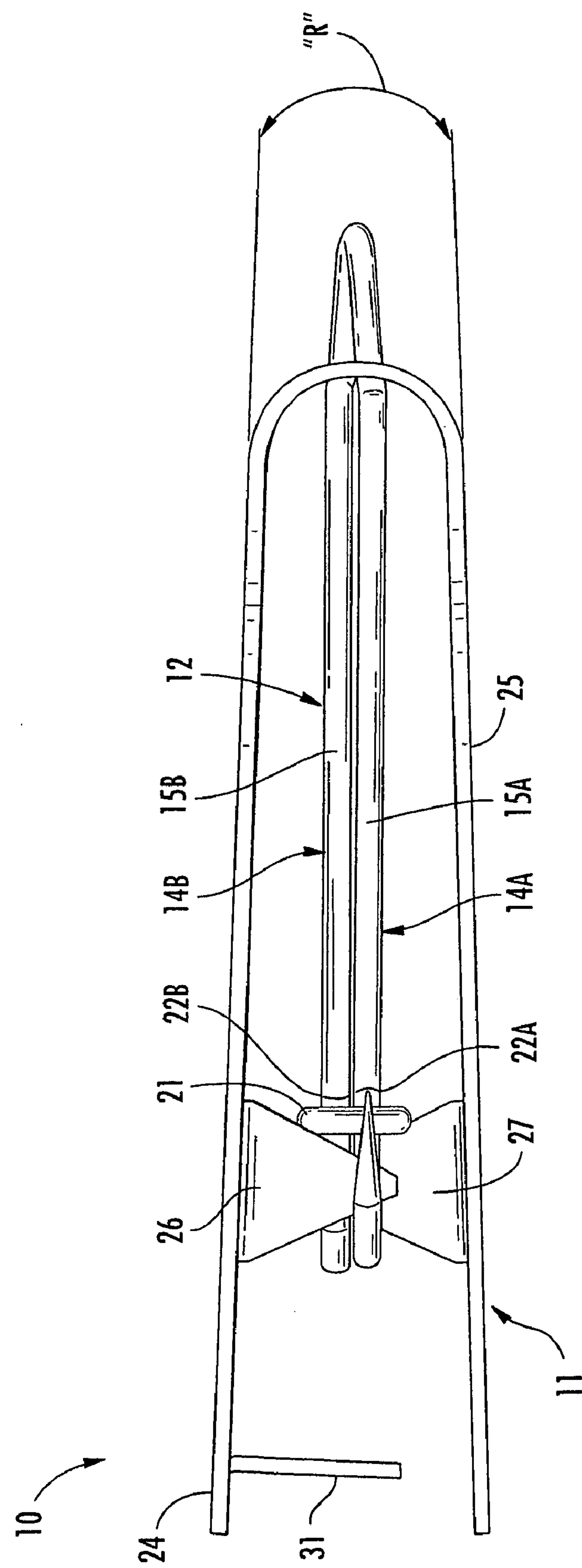
FIG. 7 is a side elevation of the mechanical fishing lure with the hook assembly in the loaded condition.
Figure 8:
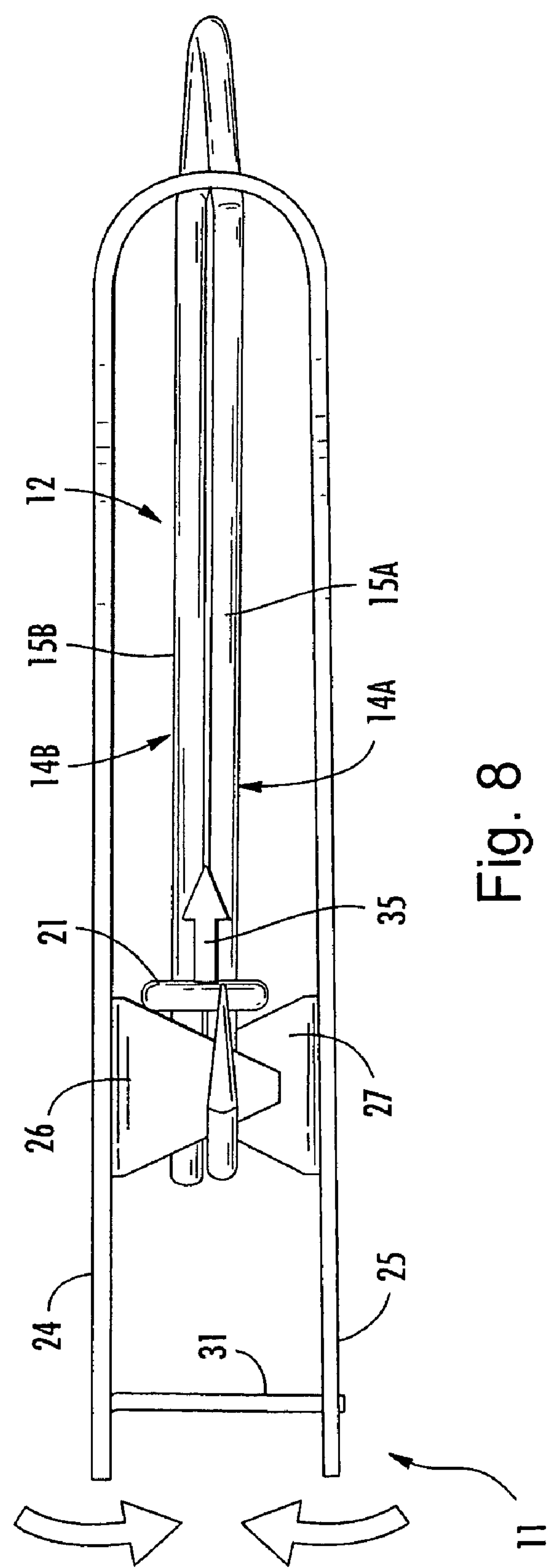
FIGS. 8 and 9 are sequential side elevations demonstrating operation of the mechanical fishing lure.
Figure 9:
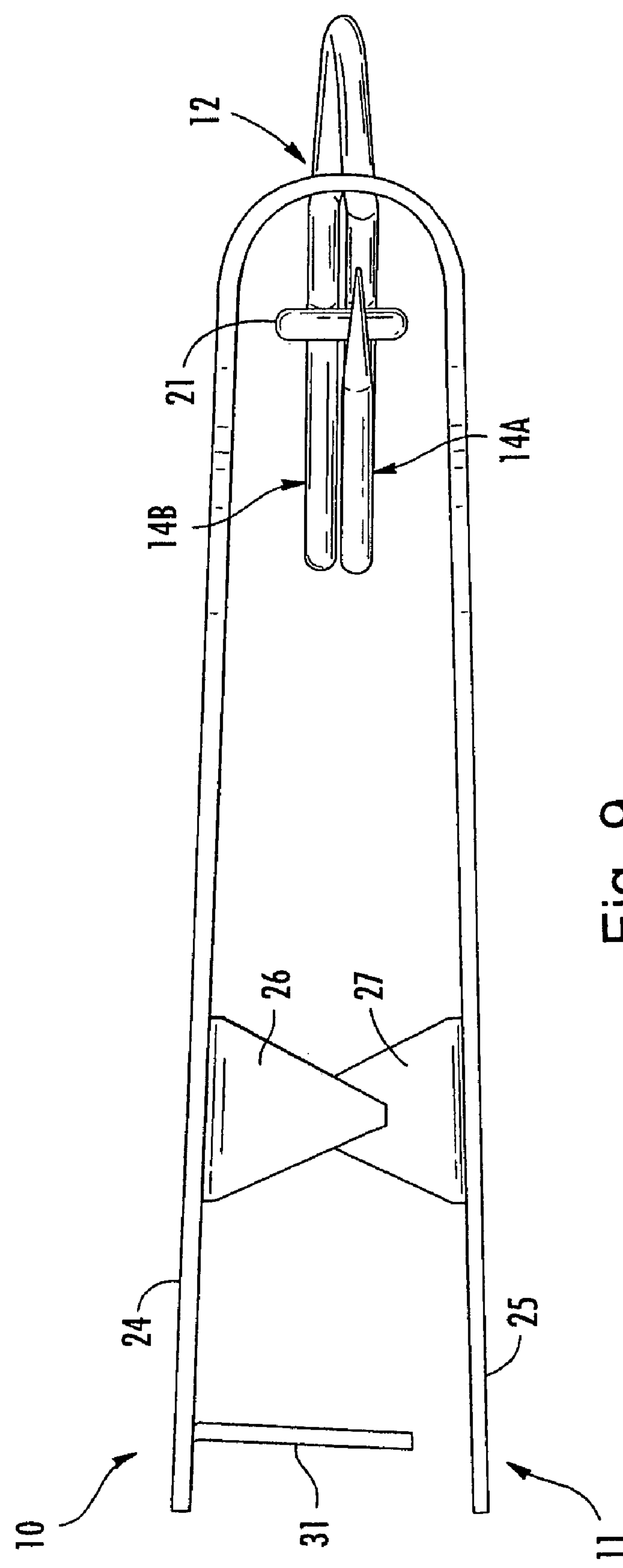

FIGS. 7, 8, and 9 demonstrate sequential operation of the mechanical fishing lure 10. The folded lure body 11 comprises a "trigger" which, when compressed, serves to trip the spring-biased hook assembly 12. FIG. 7 shows the fishing lure 10 with the hook assembly 12 in the loaded condition and the hook-setting ring 21 seated adjacent the bend 16A, 16B of each hook 14A, 14B (as also shown in FIG. 2). In this loaded condition, the fishing lure 10 may be cast outwardly into a body of water, and then drawn through the water using a conventional rod and reel outfit. As the fishing lure 10 is received into the mouth of a fish, the inward force acting on one (or both) opposing metal plates 24, 25 causes the projecting teeth 26, 27 to engage and unseat the hook-setting ring 21 from shank jogs 22A, 22B, as shown in 8, thereby releasing the spring-biased hook assembly 12. Immediately thereafter, the hook-setting ring 21 slides along respective shanks 15A, 15B towards the common eye 19, as indicated by arrow 35, while the double hooks 14A, 14B flare suddenly outwardly piecing the fish with respective points 18A, 18B. FIG. 9 (and FIG. 3) shows the hook assembly 12 in the released condition.

Figure 11:
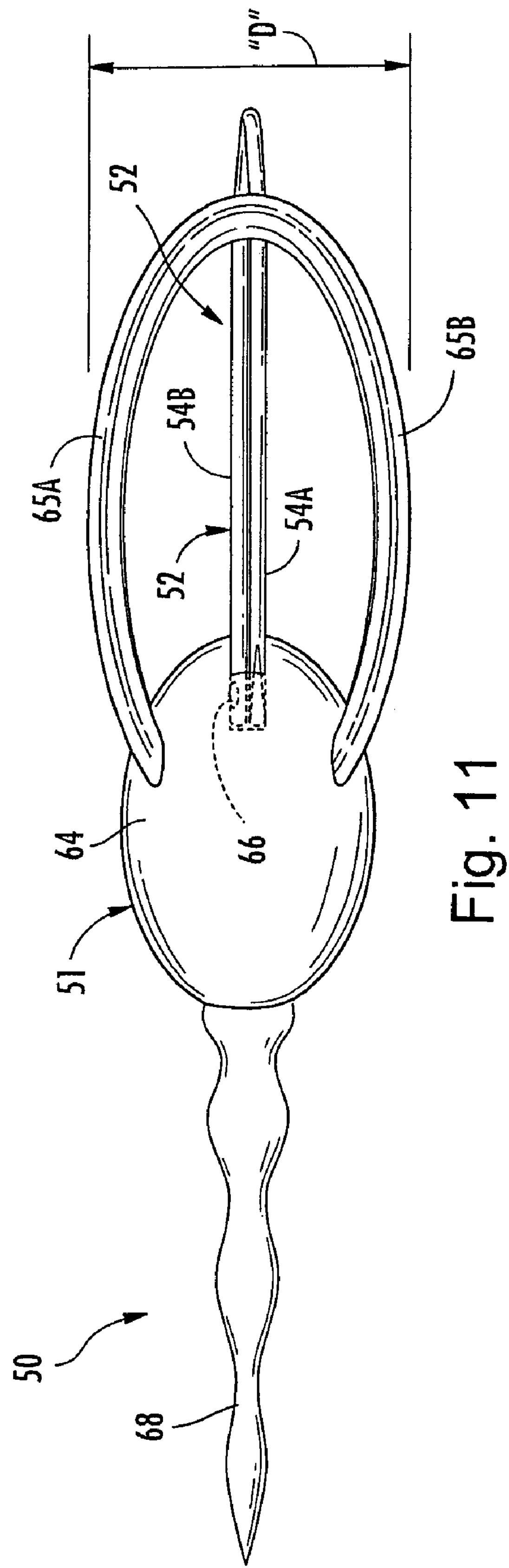
FIG. 11 is a side elevation of the mechanical fishing lure with the hook assembly in the loaded condition.
Figure 12:
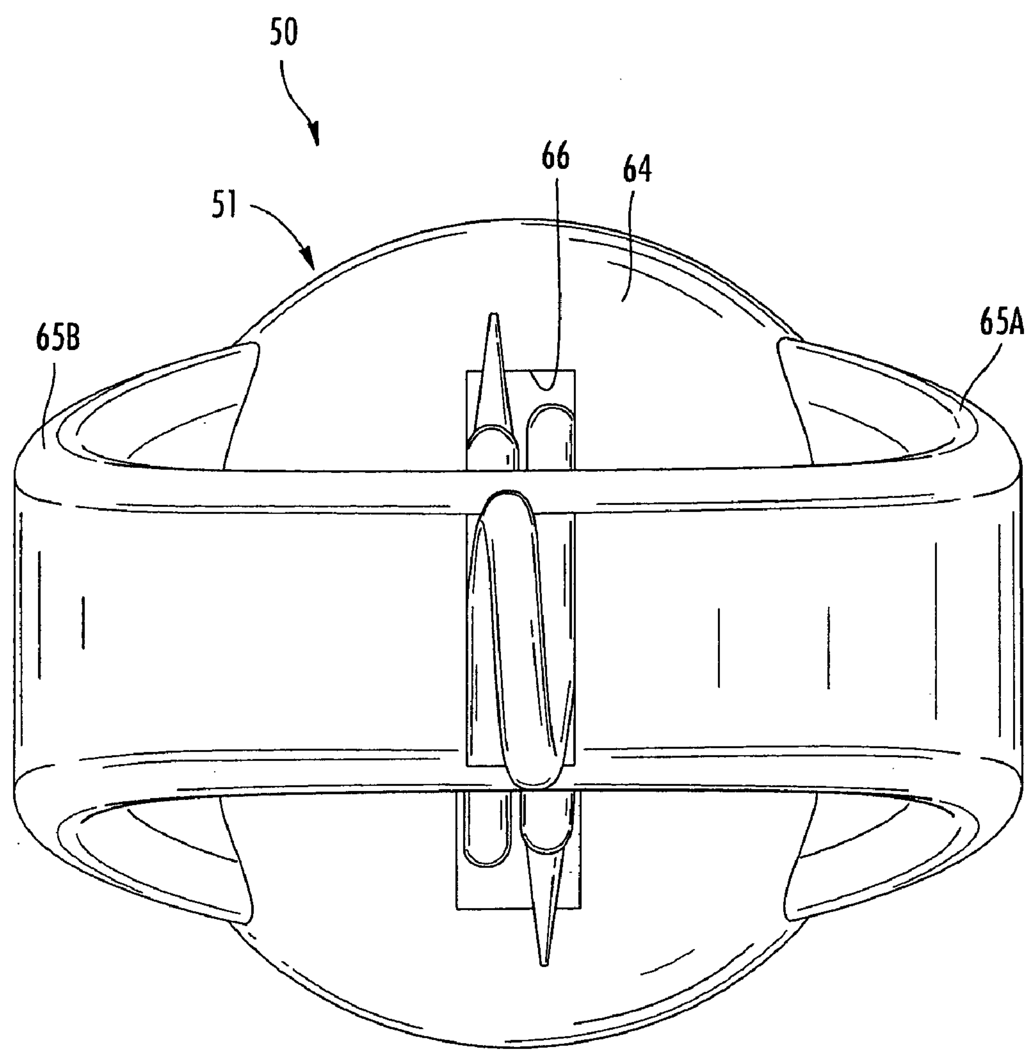
FIG. 12 is an end view of the mechanical fishing lure, and showing the hook assembly in the loaded condition.
Figure 13:
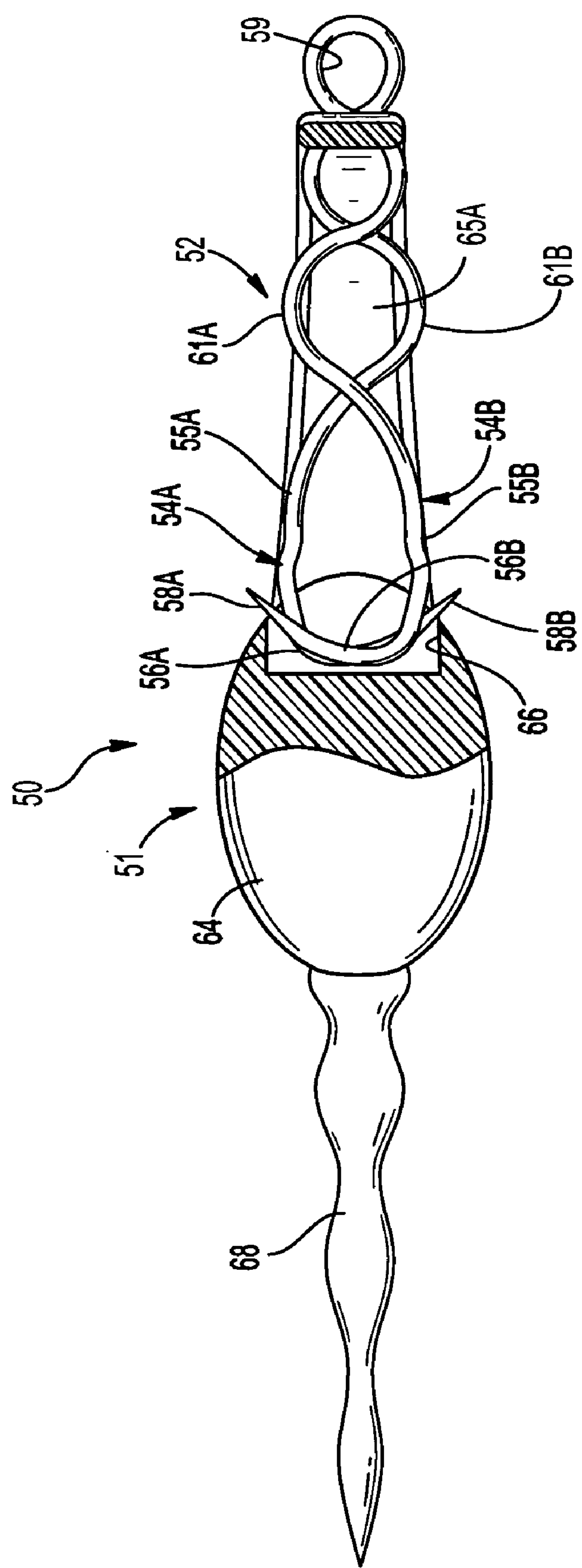
FIG. 13 is a plan view of the mechanical fishing lure with a portion of the lure body broken away to illustrate the hook assembly temporarily retained within a pocket of the hook-setting base.
Figure 14:
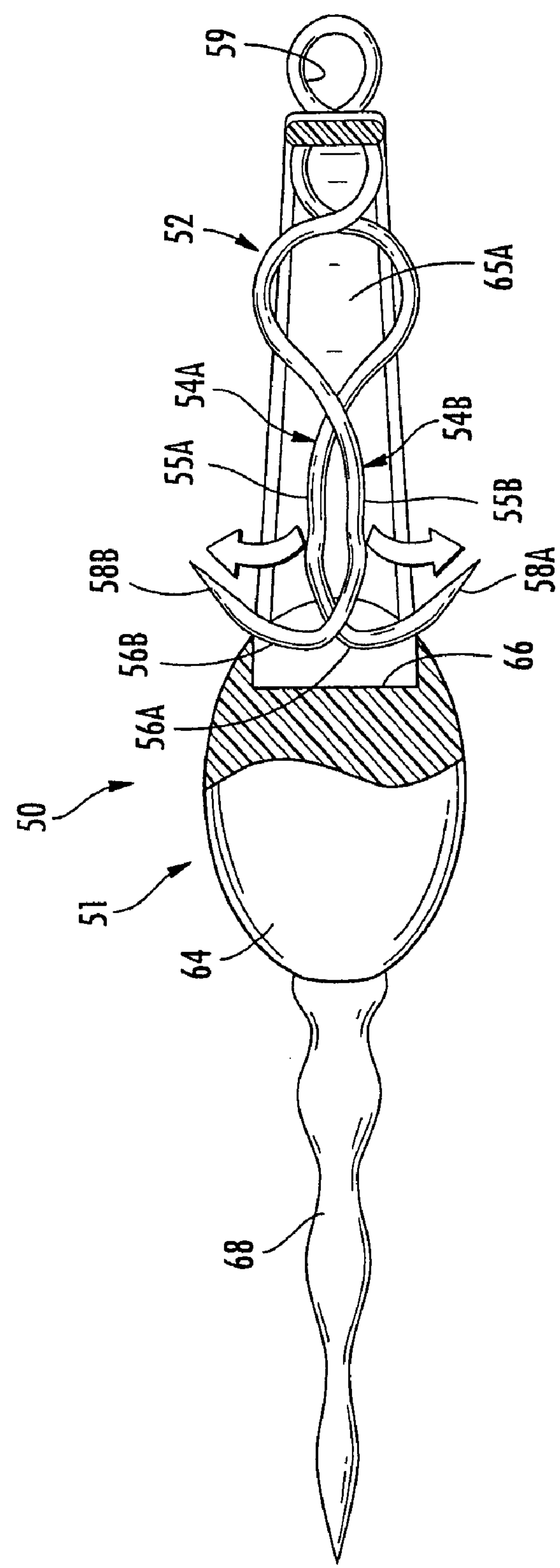
FIGS. 14 and 15 demonstrate sequential operation of the mechanical fishing lure as the hook-setting base is moved away from the hook assembly, thereby releasing the spring-loaded double hooks.
Figure 15:
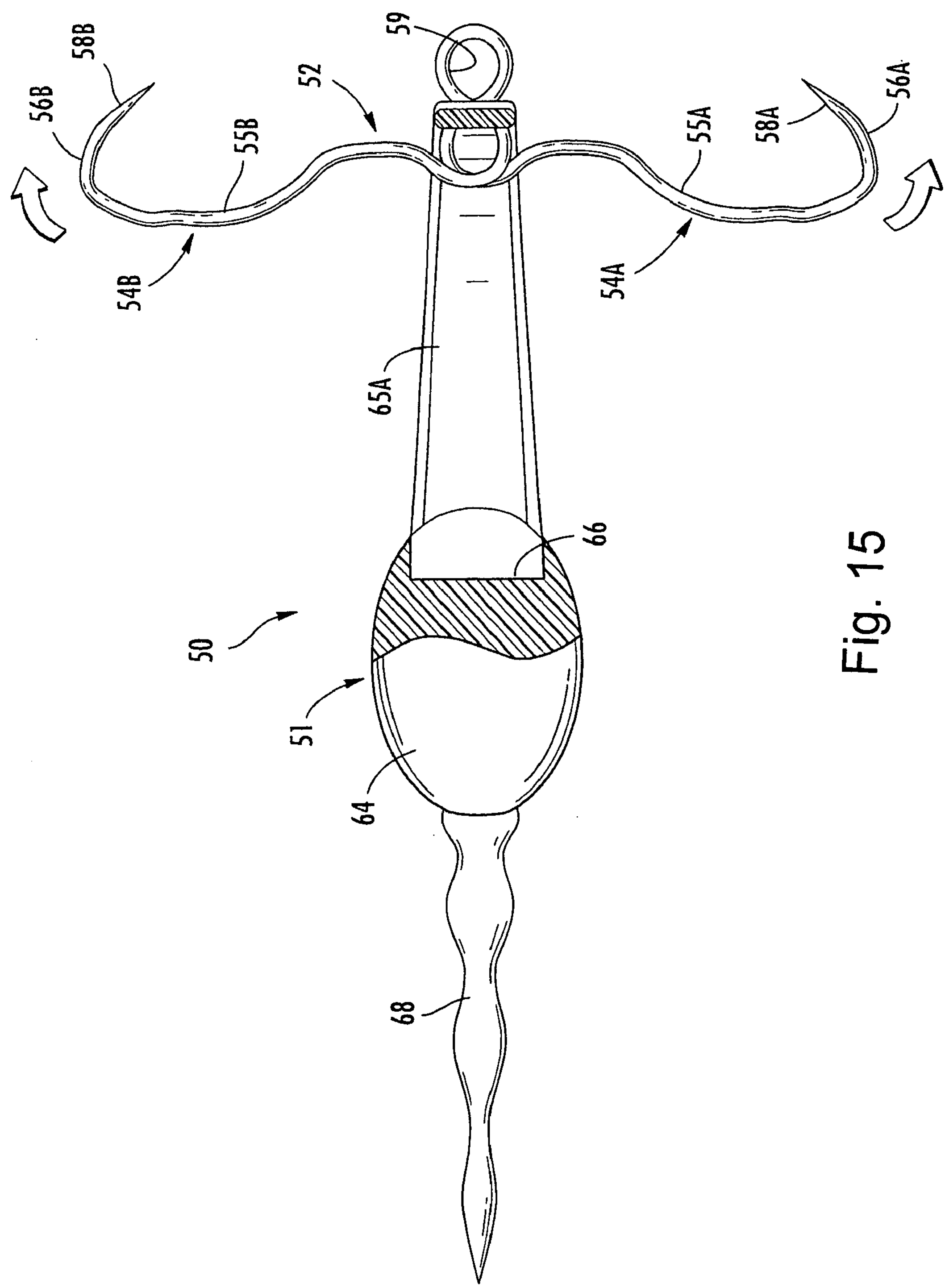

A further exemplary embodiment of an artificial mechanical fishing lure 50 is shown in FIGS. 10-15. Like that previously described, the fishing lure 50 comprises a cooperating weighted lure body 51 and spring-biased double hook assembly 52. As best shown in FIGS. 13, 14, and 15, the hook assembly 52 includes first and second integrally-formed metal hooks 54A, 54B adapted for sudden movement from a loaded condition (FIG. 13) to a released condition (FIG. 15). The hooks 54A, 54B have respective elongated shanks 55A, 55B, and oppositely directed bends 56A, 56B and points 58A, 58B. Proximal ends of the shanks 55A, 55B curve into a single common eye 59 through which a free end of fishing line may be inserted and attached. The first and second hooks 54A, 54B further define respective outwardly curved pinch points 61A, 61B adapted for being simultaneously and safely pressed together (using, e.g., the thumb and forefinger) to return the hook assembly 52 from the released condition to the loaded condition.

Figure 10:
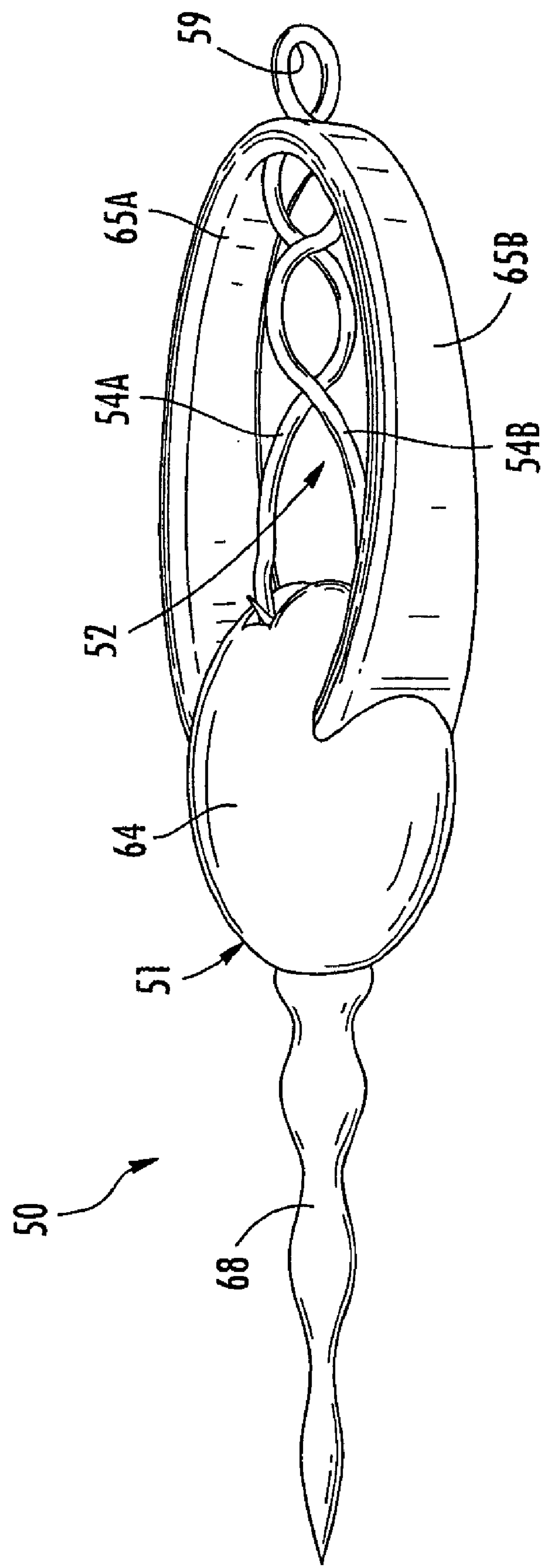
FIG. 10 is a perspective view of a mechanical fishing lure according to an alternative exemplary embodiment of the present disclosure.

Referring to FIGS. 10, 11, and 12, the exemplary lure body 51 comprises a hook-setting base 64, and a pair of pliant (and resilient) legs 65A, 65B formed with the base 64 and attached to the hook assembly 52 adjacent the eye 59. The hook-setting base 64 forms a pocket 66 (See FIGS. 13-15) designed to releasably receive a portion of the hook assembly 52 and to temporarily retain the hook assembly 52 in the loaded condition. In this loaded condition, the resilient legs 65A, 65B of the lure body 51 are flexed slightly outwardly, as best shown in FIG. 11, and are laterally spaced apart a distance "D" of between 10 mm and 20 mm at opposing points of greatest flexion. Alternatively, the distance "D" may be between 10 mm and 15 mm, or between 15 mm and 20 mm, or greater than 20 mm. The fishing lure 50 may also include a flexible tail 68 formed with the lure body 51.

FIGS. 13, 14, and 15 demonstrate sequential operation of the mechanical fishing lure 50. The opposing pliant and resilient legs 65A, 65B of the lure body 51 comprise an outwardly-flexed "trigger" which, when compressed, serves to trip the spring-loaded hook assembly 52. FIG. 13 shows the fishing lure 50 with a portion of the hook assembly 52 retained within the pocket 66 of the hook-setting base 64. In this loaded condition, the fishing lure 50 may be cast outwardly into a body of water, and then drawn through the water using a conventional rod and reel outfit. As the fishing lure 50 is received into the mouth of a fish, the inward force acting on one (or both) resilient legs 65A, 65B causes the legs to straighten, thereby forcing the hook-setting base 64 of the lure body 51 away from the loaded hook assembly 52. As the bends 56A, 56B of respective hooks 54A, 54B clear the pocket 66, as shown in FIG. 14, the spring-biased hook assembly 52 releases causing the hooks 54A, 54B to flare suddenly outwardly piecing the fish with the hook points 58A, 58B. FIG. 15 shows the hook assembly 52 in the released condition. In this condition, the resilient legs 65A, 65B of the lure body 51 are laterally spaced apart a maximum distance of less than 15 mm in one embodiment, less than 10 mm in another embodiment, and less than 5 mm in yet another embodiment.

Figure 16:
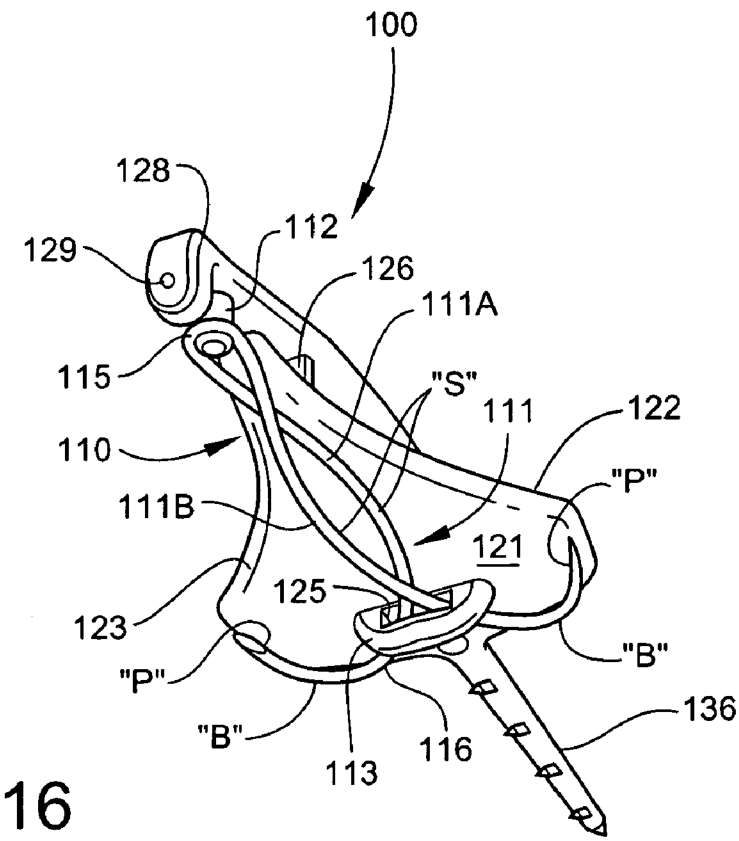
FIGS. 16-19 illustrate an alternative mechanical fishing lure according to a further exemplary embodiment of the present disclosure, and show the spring-biased hook assembly in a loaded condition.
Figure 17:
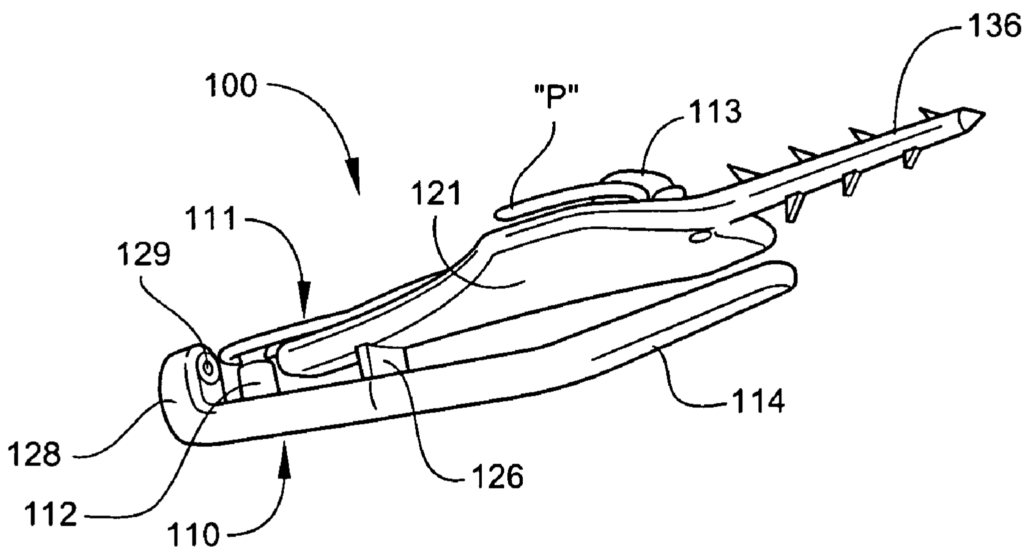
Figure 18:
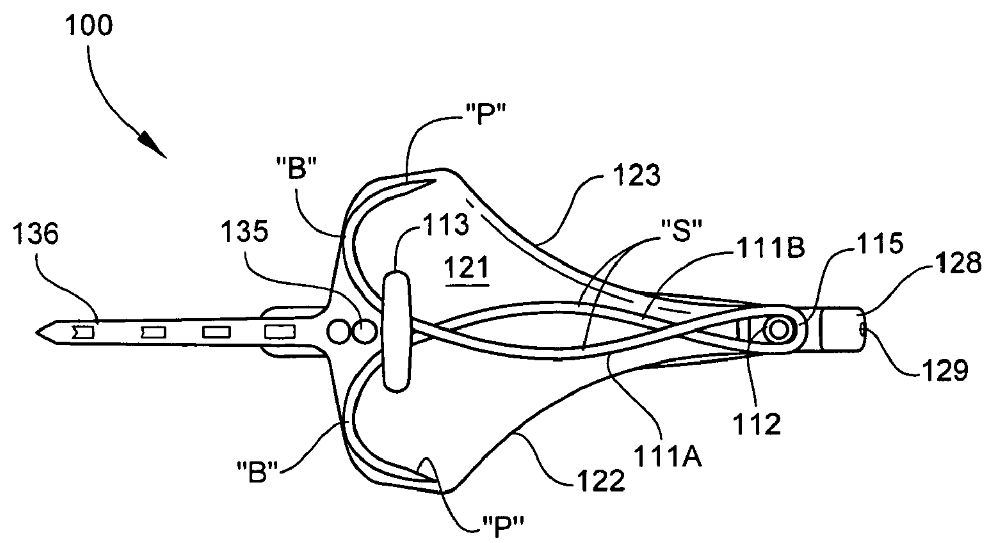
Figure 19:
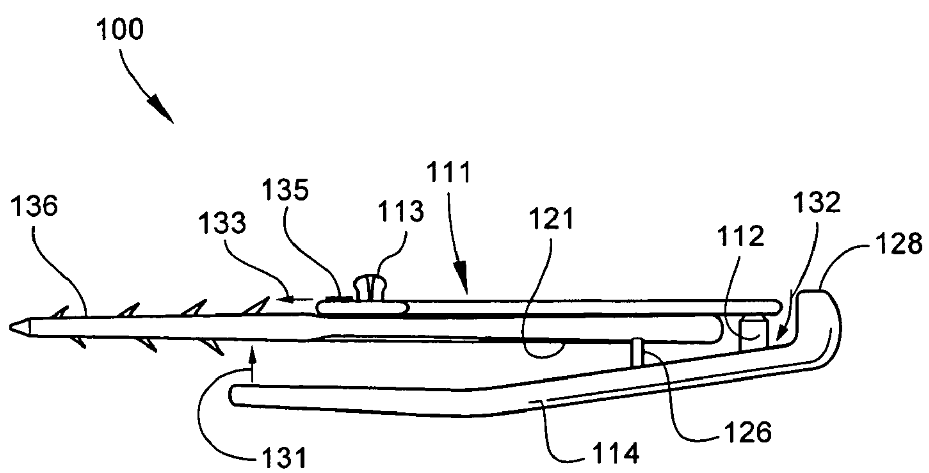
Figure 20:
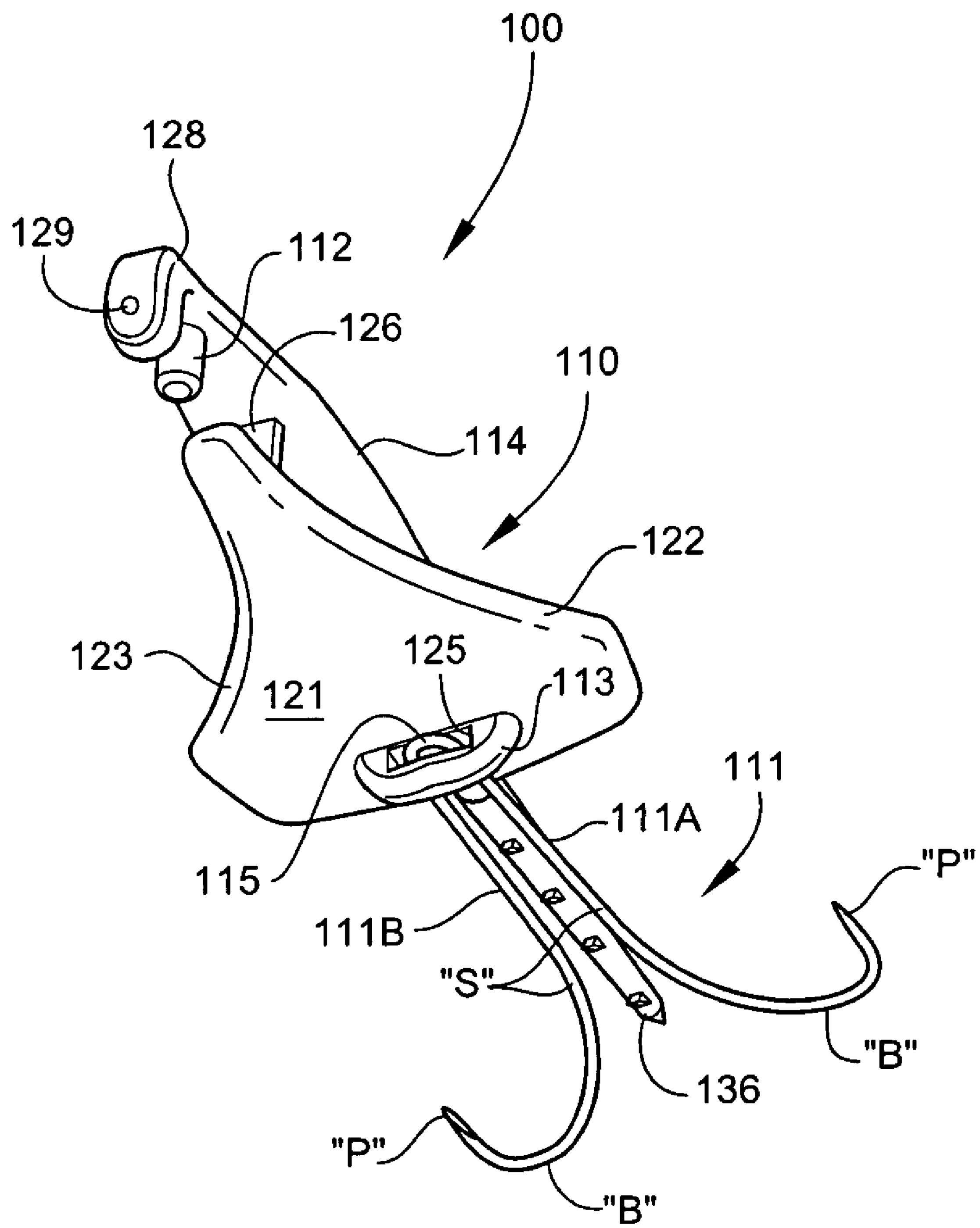
FIGS. 20-22 show the exemplary fishing lure with the spring-biased hook assembly in the released condition.
Figure 21:
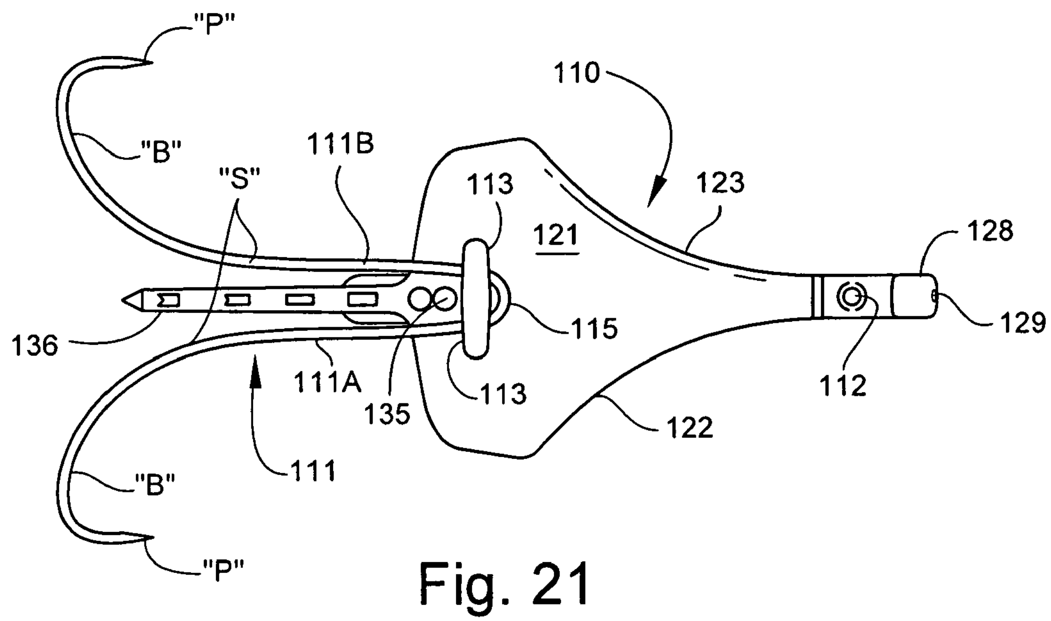
Figure 22:
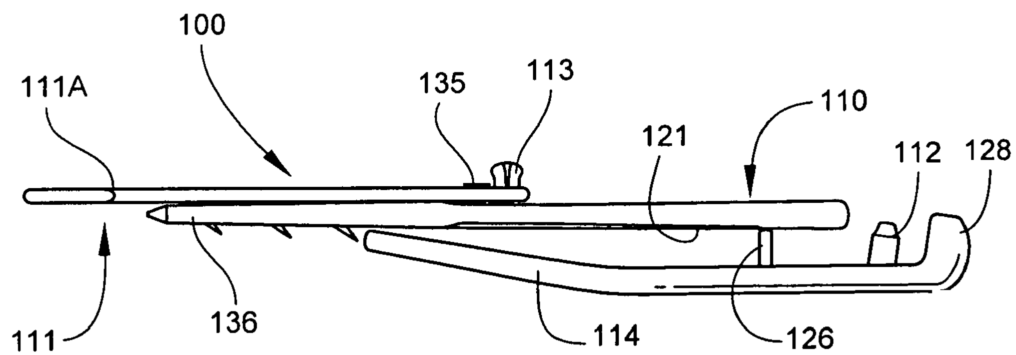

FIGS. 16-22 illustrate a further exemplary embodiment of an artificial mechanical fishing lure 100 according to the present disclosure. The fishing lure 100 comprises a base assembly 110 having spaced-apart leading and trailing ends, a spring-biased hook assembly 111 carried by the base assembly 110, a movable hook-setting post 112, a fixed retention member 113, and a pivoted actuation lever 114. The exemplary hook assembly 111 comprises first and second metal hooks 111A, 111B designed for sudden rearward movement from a spring-biased loaded condition (FIGS. 16-19) to an outwardly-flared released condition (FIGS. 20-22). The hooks 111A, 111B are integrally-formed together at a proximal end 115 (or "eye") of the hook assembly 111, and have oppositely directed bends "B" and points "P" at the distal end 116. The base assembly 110 includes a generally thin, planar body 121 having opposing outwardly curved wings 122, 123 which serve to guard respective points "P" of hook assembly 111 in the loaded condition, as best shown in FIGS. 16 and 18.

The hook-setting post 112 is located adjacent the leading end of the base assembly 110, and operates to temporarily engage the proximal end 115 of the hook assembly 111 in the loaded condition shown in FIGS. 16-19. The fixed retention member 113 is located adjacent the trailing end of said base assembly 110, and cooperates with the hook-setting post 112 to temporarily hold the hook assembly 111 in the loaded condition. In the exemplary embodiment, the fixed retention member 113 comprises a retention bridge formed with the base assembly 110, and defining a slotted underpassage 125 through which respective shanks "S" of the hook assembly 111 extend. The retention bridge 113 guides and directs movement of the double hooks 111A, 111B rearwardly from the base assembly 110 when the hook assembly 111 is released from the spring loaded condition. Alternatively, the retention member 113 may comprise any other structure capable of temporarily holding the spring-biased hook assembly 111 together until released by the hook-setting post 112, as described below.

The actuation lever 114 is connected to the hook-setting post 112 and an underside of the planar body 121 at fulcrum 126. A line-guiding head 128 defining a small through-bore 129 may be formed with the actuation lever 114 forward of the hook-setting post 112. A flexible fishing line (not shown) attached to a conventional rod and reel outfit is passed through the line-guiding head 128 and tied at the eye 115 (proximal end) of the hook assembly 111. When the lever 114 is depressed towards the planar body 121 of the base assembly 110, as indicated by arrow 131 in FIG. 19, the hook-setting post 112 moves away from and disengages the hook assembly 111 at its proximal end 115, as indicated by arrow 132. See FIG. 22. Once released from the hook-setting post 112, the curvature and shape retention (i.e., biasing force) of the metal hook assembly 111 cause sudden linear movement of the double hooks 111A, 111B rearwardly through the retention bridge 113, as indicated at arrow 133. The double hooks 111A, 111B then flare outwardly from the trailing end of the base assembly 110 into a flared condition, as shown in FIGS. 20-22, with sufficient force to catch and pierce the fish. Rearward movement of the hook assembly 111 is limited by one or more projecting hook stops 135 formed with the planar body 121. Additionally, the fishing lure 100 may include an elongated rigid bait-attaching tail 136 located at the trailing end of the base assembly 110. The tail 136 may be used for attaching live or artificial bait, such minnow, artificial worms, and the like.

In further alternative embodiments, the mechanical fishing lure may be substantially encapsulated within a larger artificial lure, or may be used or alone or in combination with other lures, tackle, or lure bodies and components, and may be of any desired size, shape, and configuration.

Exemplary embodiments of the present invention are described above. No element, act, or instruction used in this description should be construed as important, necessary, critical, or essential to the invention unless explicitly described as such. Although only a view of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

I claim:

1. An artificial fishing lure, comprising:

a substantially planar base assembly having spaced apart leading and trailing ends, and opposing substantially planar hook-side and lever-side surfaces;

a one-piece spring-biased hook assembly located on the hook-side surface of said base assembly in a loaded condition and adapted for sudden rearward linear movement from the loaded condition to a released condition, said hook assembly comprising first and second metal hooks integrally-formed together at a proximal end of said hook assembly, and having oppositely directed bends and points at a distal end of said hook assembly, the distal end of said hook assembly adapted for being pushed together against an inherent spring-biasing force such that the oppositely directed bends and points reside substantially together when in the loaded condition and flare apart by operation of the inherent spring-biasing force into the released condition, and the proximal end of said hook assembly adapted for attaching to a free end of a flexible fishing line;

a movable hook-setting post located forward of the leading end of said base assembly, and adapted for temporarily engaging the proximal end of said hook assembly in the loaded condition adjacent the hook-side surface of said base assembly;

a fixed retention member loaded adjacent the trailing end of said base assembly, and adapted for cooperating with said hook-setting post to temporarily hold said hook assembly in the loaded condition adjacent the hook-side surface of said base assembly; and a pivoted actuation lever connected to said base assembly on the lever-side surface and to said hook-setting post, said actuation lever extending rearwardly adjacent the lever-side surface of said base assembly towards the trailing end, and said actuation lever pivoting about a fulcrum to disengage said hook-setting post from said proximal end of said hook assembly when actuated, whereby said hook assembly moves in a rearward linear direction relative to said base assembly from the loaded condition to the released condition, such that when the flexible fishing line is attached to the proximal end of said hook assembly, the flexible fishing line is carried rearwardly through the leading end of said base assembly upon movement of said hook assembly from the loaded condition to the released condition.

2. An artificial fishing lure according to claim 1, wherein said hook assembly defines an eye at said proximal end thereof for receiving the free end of fishing line.

3. An artificial fishing lure according to claim 1, wherein said substantially planar base assembly comprises a substantially planar body defining opposing outwardly flared wings designed for guarding the points at the distal end of said hook assembly in the loaded condition.

4. An artificial fishing lure according to claim 1, wherein said pivoted actuation lever comprises a line-guiding head integrally formed with said actuation lever.

5. An artificial fishing lure according to claim 4, wherein said line-guiding head defines a through-bore for receiving the free end of fishing line.

6. An artificial fishing lure according to claim 1, wherein said substantially planar base assembly comprises an elongated bait-attaching tail.

7. An artificial fishing lure according to claim 1, wherein said retention member comprises a retention bridge defining an underpassage through which said hook assembly extends.

8. An artificial fishing lure according to claim 7, said substantially planar base assembly comprises a hook stop located rearward of said retention bridge, and adapted for limiting rearward movement of said hook assembly from the loaded condition to the released condition.

9. An artificial fishing lure according to claim 7, wherein said pivoted actuation lever extends rearwardly from said hook-setting post.

* * * * *